Oct. 18, 1938.   O. H. PIEPER   2,133,332
DENTAL UNIT
Filed Feb. 11, 1935   6 Sheets-Sheet 5

Fig. 34.

Witness:
Harry R. L. White.

Inventor
Oscar H. Pieper
By Brown, Jackson, Boettcher & Dienner, Attys.

Oct. 18, 1938.    O. H. PIEPER    2,133,332
DENTAL UNIT
Filed Feb. 11, 1935    6 Sheets-Sheet 6

Inventor
Oscar H. Pieper

Patented Oct. 18, 1938

2,133,332

UNITED STATES PATENT OFFICE 2,133,332

DENTAL UNIT

Oscar H. Pieper, Rochester, N. Y.

Application February 11, 1935, Serial No. 5,947

10 Claims. (Cl. 32—22)

This invention has to do with dental units intended for supporting the various dental instruments for ready access, and is directed more particularly to a novel construction and arrangement of the column or pillar of the unit, and associated features.

The unit of the instant application is, in general, quite similar to the apparatus of Patent No. 1,376,356, issued April 26, 1921, to Oscar H. Pieper and Alphonse F. Pieper, for Unitary dental apparatus, and reissued November 24, 1925, as Reissue Patent No. 16,216. The various circuits, circuit connections, and associated features of the present invention are, in the main, similar to those of the above patent and need not be here illustrated nor described in detail. Accordingly, the description to follow will be directed to the novel features of construction of the supporting column, and associated features, it sufficing to note that suitable circuits and connections, known in the art, are provided for the respective instruments hereinafter referred to.

The present invention is directed to the provision, in a unit of the character referred to, of a supporting column of novel construction in which the major portion of the electrical wiring is housed so as to be effectively protected and in such manner as to leave the interior of the column unobstructed for the accommodation of the flexible cords connected to the respective instruments, and associated parts. Preferably, the housing means for the wiring also serves to reinforce the supporting column. I also provide means associated with the column for supporting certain of the low voltage instruments and control switches therefor in such a manner as to be readily accessible for use. A further object is to provide an improved arrangement of control panel and associated parts such as to permit accurate mounting thereof with expedition and facility. Further objects and advantages will appear from the detail description.

Figure 1:
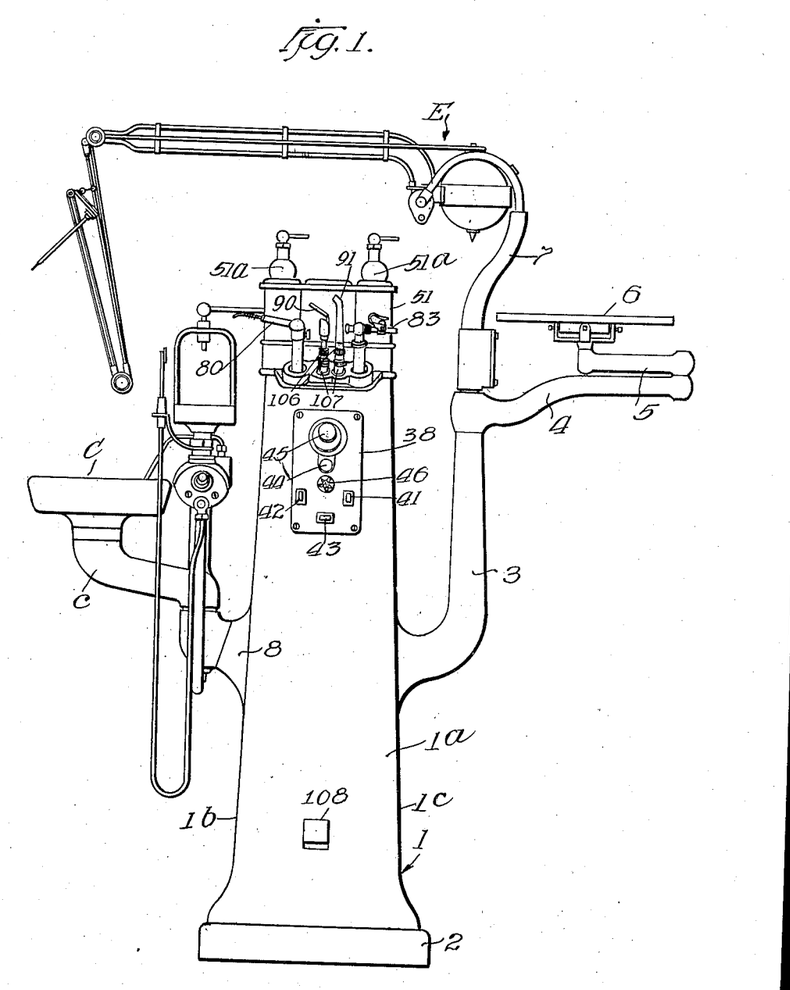
Fig. 1 is a front view of a dental unit embodying my invention.

Referring to Figure 1, the unit comprises a hollow column 1 suitably secured on a base frame 2 in a known manner, conveniently by bolting. An arm 3 projects upward from one side of column 1 and swingably supports, adjacent its upper end, an arm 4 to the outer end of which is pivoted an arm 5 carrying an instrument tray 6 of suitable type. An arm 7 is mounted for turning movement on the upper end of arm 3, coaxially therewith, and carries a dental engine E mounted thereon in the manner disclosed in the patent referred to above. Suitable motor circuits and connections, similar to those of said patent, are provided.

Column 1 is provided, at the other side thereof, with a projection 8 to which is suitably secured a hollow support c for a cuspidor C of known type. Suitable water supply and discharge conduits are provided for the cuspidor and may extend therefrom through support c and projection 8 and thence downward within column 1 in proximity to the side thereof from which projection 8 extends.

Figure 2:
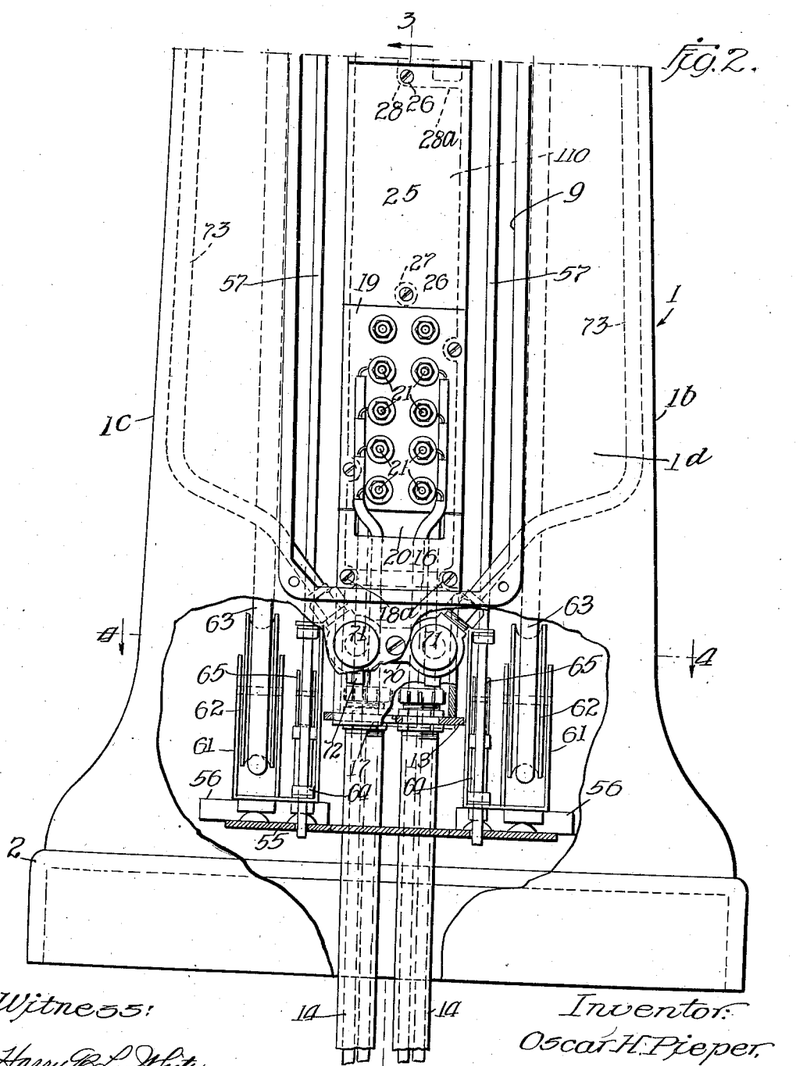
Figure 2 is a rear view, on an enlarged scale, of the lower portion of the supporting column, with the closure plate removed, partly broken away and in section.
Figure 2A:
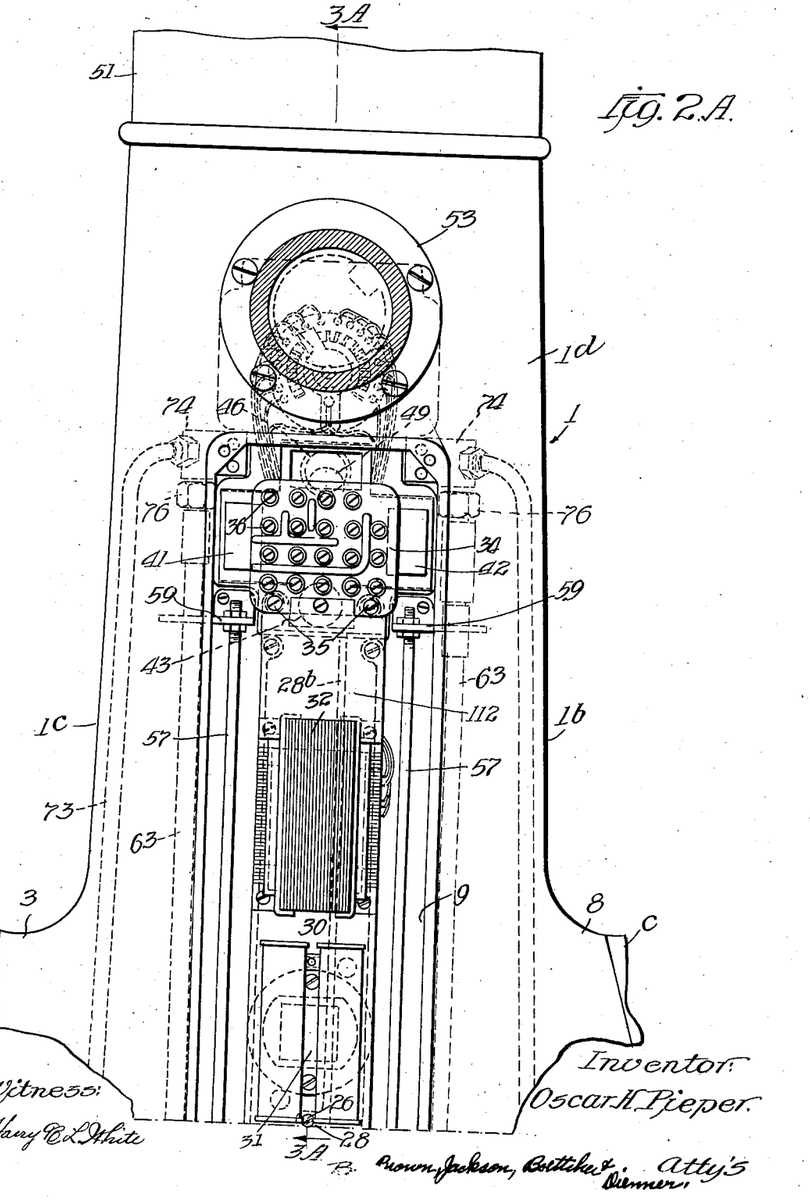
Figure 2A is a rear view, on an enlarged scale, of the upper portion of the supporting column, parts being broken away.
Figure 4:
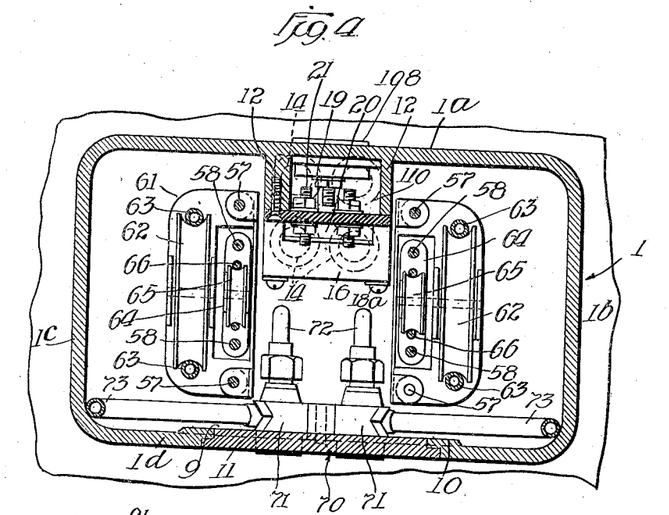
Figure 4 is a section taken substantially on line 4—4 of Figure 2, parts being shown in elevation.

Column 1 is of approximately rectangular shape in horizontal section, as in Figure 4, and comprises front wall 1a, side walls 1b and 1c, and back wall 1d. The back wall 1d is provided with an opening 9, of considerable width, disposed centrally thereof and extending the major portion of the height of the column, as shown in Figures 2 and 2A. Wall 1d is further provided with an inwardly offset flange 10 (Figure 4) extending about opening 9 and projecting a short distance therebeyond so as to define therewith a rectangular recess in which seats a correspondingly shaped flanged closure plate 11, which plate is removably secured in position in a suitable manner, as by means of screws passing through the corners of the plate and threading into flange 10. By removing plate 11, ready access may be had to the interior of the column for effecting any necessary or desirable connections or adjustments, or for any other purpose.

Front wall 1a of the column is provided, at its central portion, with two inwardly projecting ribs 12 of appreciable width which extend lengthwise of this wall in spaced parallel relation. These ribs 12 define, with the portion of wall 1a therebetween, a channel element which extends the major portion of wall 1a and provides a substantial reinforcement therefor. This channel element also provides a housing for the major portion of the electrical wiring, leaving the interior of the column free thereof, as will be hereinafter described more fully.

Figure 3:
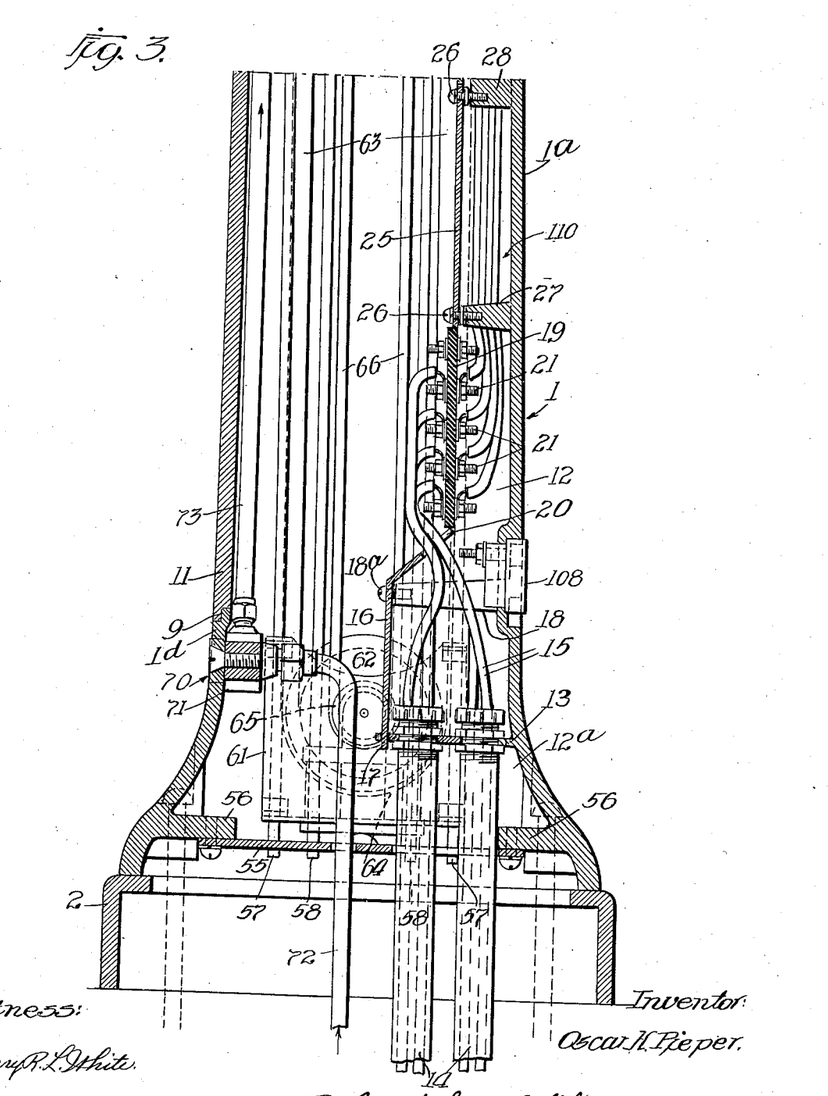
Figure 3 is a section taken substantially on line 3—3 of Figure 2.

A horizontal web 13 connects ribs 12 adjacent their lower ends, and is provided with suitably disposed openings for reception of conduits 14, the upper ends of which are secured through the webs in a known manner. The conduits 14 contain the wires 15 of the main and auxiliary circuits. The ribs 12 are of increased width at their lower portions 12a, the upper ends of these widened portions being connected to the body portion of the respective ribs by an upwardly and forwardly inclined shoulder, as in Figure 3. A shield 16 extends upward from web 13 and seats against the inner or rearward edges of widened portions of ribs 12. The upper portion of this shield is inclined upward and forward and seats upon the shoulders of the widened portions of the ribs, above referred to. Web 13 projects inward a short distance beyond elements 12a of ribs 12, and is provided with a slot which receives a tongue 17 projecting from the lower end of shield 16. Two bosses 18, conveniently formed by thickening elements 12a of ribs 12, projecting inward from front wall 1a of the column, and have their inner or rearward ends suitably bored and threaded for reception of screws 18a passing through shield 16 and removably securing the latter in position. The upper portion of shield 16 extends upward and forward beneath the lower edge of a connection panel 19, and is provided with a suitably shaped cut-out or notch 20, extending from its upper edge, which accommodates the wires 15. Panel 19 is formed of suitable insulating material and is secured to ribs 12 in a suitable manner, conveniently by screws passing through the panel and threading into thickened portions or bosses of ribs 12, as in Figure 2. The panel 19 carries sets of binding posts 21 of known type, which extend through the panel and project beyond both faces thereof. Certain of these sets of binding posts may be spares which normally are not used. Wires 15 are led upward between elements 12a of ribs 12 and through notch 20 of shield 16 to the rear of panel 19, where they are attached to the appropriate binding posts 21. It will be seen that these wires 15 are effectively housed by the conduits 14, and elements 12a of ribs 12 and shield 16, except for the short lengths thereof at the back of panel 19.

A cover plate 25 extends upward from panel 19 and is secured by screws 26 to studs 27 and 28 projecting rearward from wall 1a of column 1. The latter stud is connected by a web 28a to one of the ribs 12, and by a rib 28b to wall 1a, the latter rib being adjacent and parallel to rib 12 from which web 28a extends, and extending from stud 28 to the upper end of the channel. Rib 28b provides additional reenforcement for the upper portion of wall 1a, which supports transformers for the engine motor and the low voltage instruments and associated parts.

The upper portion of the channel is covered by a plate 30 removably secured to ribs 12 in a suitable manner, conveniently by screws passing through the plate and threading into thickened elements or bosses of ribs 12, as indicated in Figure 2A. Transformers 31 and 32 are mounted upon plate 30 by suitable brackets secured to the plate by screw means, or in any other suitable manner. Plate 30 is provided, at each upper corner, with an element which is bent rearward and then upward to provide an L-shaped bracket 33, to which is secured a connection block 34, by screws 35, this block being of suitable insulating material and carrying binding posts 36 for effecting the appropriate connections to the various instruments and associated parts.

Wall 1a of column 1 is provided, at the upper portion thereof, above the channel member, with an opening 37 closed by a panel 38 of suitable material, which may be removably secured to wall 1a in a suitable manner, as by screw means. A plate 40 is suitably secured to the rearward face of panel 38, conveniently by screws, and supports switches 41, 42 and 43, of which switch 43 may be the main control switch, switch 41 controlling the circuits for the low voltage instruments and switch 42 controlling the circuit of the motor for the engine. The upper portion of panel 38, above plate 40, is offset outwardly and inclined forward and downward, this portion carrying a socket or casing 44 for a pilot light and also carrying the voltage regulator 45 comprising two concentric knobs and suitable contacts, this regulator being of known type. The plate 40 is further provided with an opening which is in alignment with a bull's eye 46 suitably secured in panel 38. A lamp socket 47 is supported by bracket 48 secured to plate 40, and carries a suitable lamp 49 disposed in back of the bull's eye.

Suitable taps are taken from the transformer 32 and are connected by flexible leads 50 to the appropriate contacts of the regulator. Taps are also taken from the transformer 32 and connected by suitable leads to appropriate contacts, these latter leads passing through plate 30 and thence upward between ribs 28b and rib 12 adjacent thereto. It will be understood that suitable connections are made between the binding posts 36 of the connection block 34 and the appropriate contacts for controlling the various circuits. It will also be understood that certain of these binding posts 36 are connected to the wires in the cords leading to the low voltage instruments, the ends of these cords to which the binding posts are connected being anchored in a suitable manner.

Column 1 is provided, at the top thereof, with an upwardly extending housing 51 which accommodates electrical heating means of known type for heating water in a tumbler or other suitable container, such as a water syringe, and for heating the contents of atomizer bottles 51a, in a known manner. The column 1 is further provided at the back and adjacent the top thereof, with a suitable outlet 52 to which may be bolted, or otherwise suitably secured, a support 53 for either a spot light or an overhead general illuminating lamp (not shown), as is known in the art, support 52 having openings therethrough for accommodating the leads to the lamp.

A plate 55 is suitably secured, conveniently by screw means, to lugs 56 projecting inward from the front and back walls of column 1 adjacent the lower end thereof. Two pair of guide rods 57 and 58 have their lower ends suitably anchored in plate 55 and are disposed at opposite sides of the channel element, as in Figure 4. The upper ends of rods 57 and 58 are anchored in brackets 59 secured to bosses 60 projecting from the inner or rear face of front wall 1a adjacent the lower end of opening 37 therethrough. Each of pair of rods 57 slidably receives the ends of a U-shaped guide frame 61 in which is rotatably mounted a grooved pulley or sheave 62 about which is passed a flexible air hose 63. The frame 61 and pulley 62 constitutes weight means for maintaining the hose 63 under appropriate tension and returning the instrument attached to the hose to its normal inoperative position when not in use. Frame 61 passes about a pulley frame 64 slidably on the rods 58 and carrying a grooved pulley or sheave 65 about which passes a flexible cord 66 to which is connected a suitable low voltage instrument. Frame 64 and pulley 65 serve to maintain the cord 66 under appropriate tension and to return the instrument to inoperative position when not in use.

An air connector 70, comprising two separate but integrally united chambers 71 is suitably secured, as by screw means, to back wall 1d of the column adjacent the lower end thereof. Air is supplied to the chambers 71 from a suitable source of supply of air under pressure, not shown, by tubes 72 connected to the respective chambers. Tubes 73 are connected at their lower ends to the chambers 71 and extend upward along the rear corners of the column to connectors 74 secured in a suitable manner, conveniently by means of screws, to bosses 75 formed on the inner face of wall 1a adjacent opening 37 thereof. One end of the respective hose 63 is secured to the outlet of connector 74 by a coupling 76, this coupling also providing an anchor for the end of the hose. The air hose passes downward from coupling 73 through a suitable opening in bracket 59, thence about sheave 62 and then upward through the bracket to an instrument attached to the other end of the hose. A hot air syringe 80 may be attached to the other end of one hose 63. The hot air syringe may have associated therewith suitable heating means, this means being connected by leads to appropriate binding posts on the connection block 34, as is known in the art. An air cut-off nozzle 83 (Figure 1) is suitably connected to the other air hose 63, this nozzle being adapted for quick attachment to atomizers containing suitable liquids for use in dental work, in a known manner. Conveniently, the hot air syringe 80 and the air nozzle 83, when not in use, are supported in an instrument holder or block 84 of suitable insulating material, being disposed adjacent the ends of the block.

Forward portion 85a of top wall 85 of the column is inclined downward and forward, and is provided with an opening which receives reduced portion 84a of block 84. Two metal tubes 86 are suitably secured in block 84 adjacent the ends thereof and extend therefrom at an inclination downward and rearward of the column. The upper portion of each tube is flared to provide a seat for the lower end portion of the hot air syringe 80, or the air cut-off 83, as the case may be, it being noted that the lower end of tube 86 is flared to provide a smooth surface over which the hose 63 passes during use of the instrument.

Figure 3A:
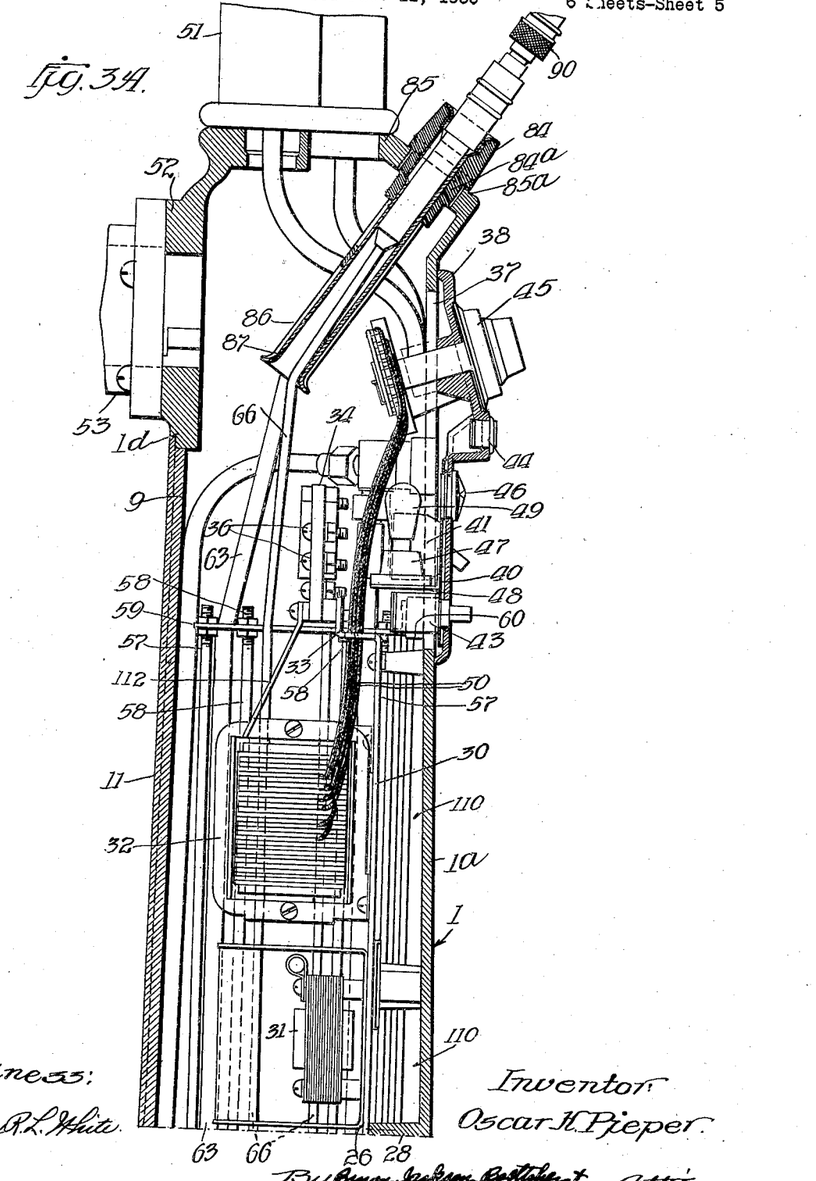
Figure 3A is a section taken substantially on line 3A—3A of Figure 2A.
Figures 5, 6:
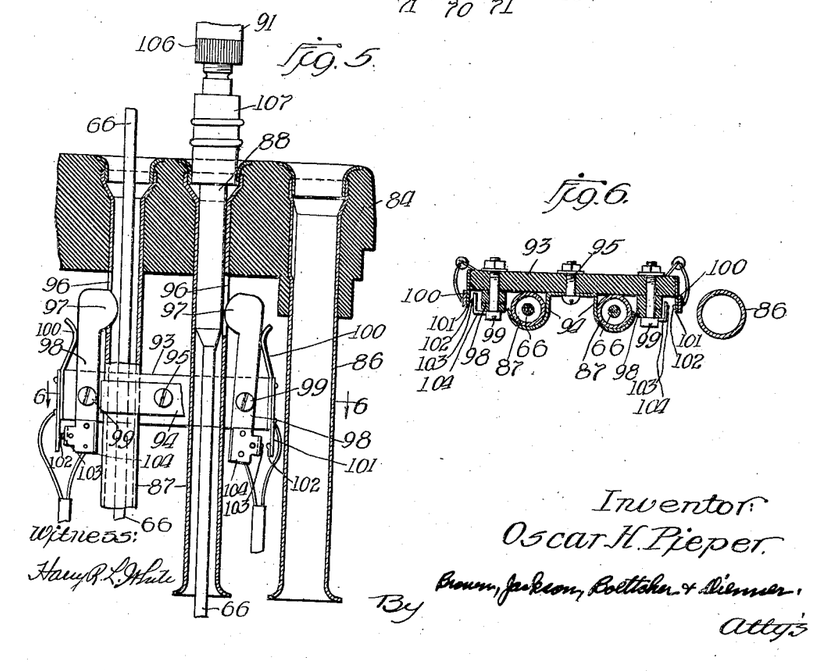
Figure 5 is a fragmentary lengthwise section through the low voltage instrument and switch block, on an enlarged scale, parts being shown in elevation.
Figure 6 is a section taken substantially on line 6—6 of Figure 5.

The block 84 also carries, between the tubes 86, two metal tubes 87, shown in Figure 5. The tubes 87 receive hand pieces or switch handles 88 which are adapted for reception of low voltage electrical instruments. I have shown a mouth examination lamp 90 and associated mirror mounted on one of the switch handles (Figures 1 and 3A) and a pulp tester 91 (Figure 1) mounted on the other switch handle, but it will be understood that various electrical instruments may be used in conjunction with the switch handles.

A strip of insulation 93 is attached to the tubes 87 in any suitable manner, as by means of a clamp 94 and associated screw and nut means 95. Each of the tubes 87 is provided with a radial slot 96 for reception of head 97 of a switch arm 98, of suitable insulating material, pivoted at 99 on strip 93. Head 97 of arm 98 is urged toward the adjacent tube 87 by a leaf spring 100 secured to the adjacent end of strip 93. A contact strip 101 is also secured to the end of insulating strip 93 and extends downward therefrom. Strip 101 is provided with a contact point 102 which coacts with a contact point 103 of a contact strip 104 secured upon the lower end of switch arm 98.

Electric cords 66 extend upward through tubes 87 and are connected to the respective switch handles 88. Each of the cords carries two conductors, and it will be understood that the other ends of the conductors of the respective cords 66 are connected into appropriate circuits, including the contact points 102 and 103, for closing the low voltage circuit of the instrument upon movement of switch arm 98 into circuit closing position.

Each switch handle 88 is provided at its upper end with a head 106, of suitable insulating material, for securing in the switch handle, in a known manner, the various instruments used therewith, and is also provided with a collar 107, below head 106, which limits downward movement of the switch handle in tube 87. When handpiece or switch handle 88 is in its normal lowered position, as shown in Figure 5, switch arm 98 is held in the position shown at the right of Figure 5, by contact of handpiece 88 with head 97 of the arm, thus opening the circuit. Upon upward movement of handpiece 88, in the withdrawal thereof from tube 87 for use, head 97 of switch arm 98 is released and this arm may be then moved by leaf spring 100 into its circuit closing position shown at the left of Figure 5, thus closing the circuit of the associated instrument. In this manner, I provide, adjacent each of the handpieces or switch handles mounted in the block 86, a control switch therefor which is of simple construction and operation, and is effective for closing the circuit of the instrument mounted in the handpiece, upon withdrawal of the latter from the instrument support or block for use, and for opening the circuit of the instrument upon return of the handpiece to the block.

Referring to Figure 4, it will be noted that the channel member is disposed centrally of front wall 1a of the column with the guide rods 57 and 58, and associated parts, disposed at opposite sides of the channel member with the space between the sets or pairs of guide rods unobstructed for substantially the full interior length of the column. The channel member provides a housing for the major portion of the wiring, designated 110, the channel member thus serving effectively to house the wiring while also confining it at the central portion of the front of the column. The interior of the column is thus free, for the major portion of its length, of electric wires and ready access may be had to the various apparatuses and parts thereof within the column. This applies particularly to the channel member and parts associated therewith, it being noted that the space between this member and the back wall of the column is unobstructed, thus giving ready access to the parts associated with the channel member as well as to the guide rods, pulleys, cords and associated parts. It will further be noted that plate 30 and the parts associated therewith may be assembled as a unit exterior of the column and then inserted through the opening at the back of the column, and the plate 30 secured to the channel member in the manner previously described. In this connection, it is pointed out that the leads between the transformer apparatus and the regulator means associated with the panel 38 are flexible so that this panel 38 and the plate 30 may be separately positioned and secured, within the limits of the leads referred to. This is a distinct advantage in that it greatly facilitates the mounting of the plate 30 and associated parts and the panel 38 and associated parts. Preferably, though not necessarily, I provide a suitable shield 112 which extends upward and forward from transformer 32 and is secured to the lower portion of connection block 34, this shield serving to protect leads 50 extending from the transformer.

A suitable socket 108 is mounted in front wall 1a of the column adjacent the lower end thereof, for reception of a plug for connection of a foot operated motor controller, which controls operation of the dental engine E in a known manner. The socket 108 and the controller and the connection plug associated therewith are of known type and need not be illustrated nor described in detail.

By providing the channel member at the front of the column and housing the major portion of the wiring therein, the interior of the column may be arranged in a neat and orderly manner so as to give ready access to all parts therein, the major portion of the wiring is effectively protected from injury, and the front wall of the column may be of lighter construction due to the material reinforcement afforded by the channel member. This contributes to increased efficiency, neatness of appearance and reduction in weight, all of which are desirable.

What I claim is:—

1. In a dental unit, a hollow column, a reinforcing channel member integral with and extending lengthwise of said column for the major portion of the length thereof, and electrical apparatuses supported in part by said column and in part by said channel member, the latter housing the major portion of the wiring for said apparatuses.

2. In a dental unit, a hollow column of approximately rectangular cross-section, a channel member at the rear of and integral with the front wall of said column and extending the major portion of the length thereof, and electrical apparatuses supported by said front wall and by said channel member, the major portion of the wiring for said apparatuses being enclosed within said channel member, the rear wall of the column having an opening giving access to said channel member.

3. In a dental unit, a hollow column of approximately rectangular cross-section, a channel member integral with the front wall of the column centrally thereof and opening rearward therefrom, said member extending the major portion of the length of said front wall, the back wall of the column having an opening extending the major portion of its length and aligned with said channel member, and electrical apparatuses supported by said front wall and by said channel member, the major portion of the wiring for said apparatuses being disposed within said channel member.

4. In a dental unit, a hollow column of approximately rectangular cross-section, a channel member integral with the front wall of the column centrally thereof and opening rearward therefrom, said member extending the major portion of the length of said front wall, the back wall of the column having an opening extending the major portion of the length and aligned with said channel member, a plate removably mounted on the channel member and closing the back thereof, electrical apparatuses mounted on said plate, said front wall having an opening therein above said channel member, a panel on said front wall over said opening, and electrical apparatuses mounted on said panel and connected to the apparatuses mounted on said plate, the major portion of the wiring for said apparatuses being disposed within said channel member.

5. In a dental unit, a hollow column of approximately rectangular cross-section, a channel member integral with the front wall of the column centrally thereof and opening rearward therefrom, said member extending the major portion of the length of said front wall, the back wall of the column having an opening extending the major portion of its length and aligned with said channel member, electrical apparatuses supported by said front wall and by said channel member, the major portion of the wiring for said apparatuses being disposed within said channel member, guide means disposed within the column at opposite sides of said channel member, weight and pulley devices slidable on said means, and flexible instrument cords passing beneath the pulleys of said devices and then upward within the column, said devices and said cords being disposed at opposite sides of said channel member whereby the space between the latter and said opening of said back wall is unobstructed for ready access to said channel means and associated apparatuses.

6. In a dental unit, a hollow column of approximately rectangular cross-section, a channel member integral with the front wall of said column centrally thereof and opening rearward therefrom, said member extending the major portion of the length of said front wall, the back wall of the column having an opening extending the major portion of its length and aligned with said channel member, electrical apparatuses supported by said front wall and by said channel member, the major portion of the wiring for said apparatuses being disposed within said channel member, guide means disposed within the column at opposite sides of said channel member, weight and pulley devices slidable on said means, flexible instrument cords passing beneath the pulleys of said devices and then upward within the column, and air supply tubes disposed within the column adjacent the sides thereof and connected to certain of said cords, said devices and said cords being disposed at opposite sides of said channel member whereby the space between the latter and said opening of said back wall is unobstructed for ready access to said channel means and associated apparatuses.

7. In a dental unit, a hollow column having a front wall, a reinforcing channel member rigid with and extending the major portion of the length of said wall at the inner face thereof, and electrical apparatuses mounted on and supported by said wall at the outer face thereof, said channel member housing the major portion of the wiring for said apparatuses.

8. In a dental unit, a hollow column, a supporting block mounted on the column adjacent the upper end thereof, tubes depending from said block within said column, electrical instruments normally seating in said block and extending into said tubes and removable therefrom, and individual switches carried by said tubes for controlling the circuits of said instruments, each comprising a switch arm yieldingly urged toward one of said tubes into circuit closing position, each tube having an opening through its wall and each switch arm having an element disposed to project through said opening into the associated tube in the closed circuit position of said arm, the switch arm being moved into open circuit position by contact of an instrument with said element upon insertion of the instrument into its associated tube.

9. In a dental unit, a hollow column, a reinforcing channel member rigid with and extending lengthwise of said column within the latter for the major portion of the length thereof, and electrical apparatuses mounted on and supported in part by said column exteriorly thereof and in part by said channel member interiorly of said column, said channel member housing the major portion of the wiring for said apparatuses.

10. In a dental unit, a hollow column, a supporting block mounted on the column, tubular members carried by said block confined against movement relative thereto and extending within said column, electrical instruments normally seating in said block and free for insertion into and withdrawal from said tubular members at will by lengthwise movement relative thereto while the positions of said tubular members relative to said block remain unaltered, and switches mounted within said column adjacent the respective tubular members having elements movable in opposite directions normally disposed in the path of lengthwise movement of said instruments for individually controlling the circuits thereof, said instruments causing movement of said elements in one direction and permitting movement of said elements in the other direction effective for causing opening and closing of said switches responsive to lengthwise insertion and withdrawal of said instruments.

OSCAR H. PIEPER.